Patented Mar. 26, 1935

1,995,753

UNITED STATES PATENT OFFICE 1,995,753

MANUFACTURE OF HYDROCARBON PRODUCTS CONTAINING OXYGEN

Alfred Schaarschmidt, deceased, late of Berlin-Charlottenburg, Germany, by Erna Magda Irmgard Schaarschmidt, administratrix, of Berlin, Germany, assignor to Antares Trust Registered, Vaduz, Liechtenstein No Drawing. Application August 5, 1933, Serial No. 683,898. In Germany August 8, 1932

8 Claims. (Cl. 260—134)

This invention relates to a process for producing organic products containing oxygen from hydrocarbons. More particularly the invention relates to the production of ketone-like products from saturated aliphatic or alicyclic hydrocarbons by reacting the same with a carbonyl halide such as phosgene in the presence of an aluminum compound with a non-gaseous halogen and by maintaining the temperature below normal room temperature. This application is directed to subject matter similar to that in copending application Serial No. 683,897.

Previously in the prior art an attempt has been made to obtain ketone-like products from hydrocarbons but the results have not been satisfactory or commercially acceptable under all conditions since the products obtained were not pure and chiefly consisted of low quality resinous polymers having a high boiling point.

It was found, however, that by means of the invention as disclosed herein, substantially pure and desirable ketone-like products suitable for use in the perfumery and soap industry, as well as other uses, can be obtained.

In carrying out the reactions, it is of the greatest importance to obtain products of low boiling point, the molecular size of which corresponds to the unaltered molecular size of the starting hydrocarbons without forming secondary condensation into higher molecular or resinous forms which are worthless. It is desirable to direct the operation so that only the primarily formed ketone-like products are obtained. It was found that in operating with low reaction temperatures that is, temperatures below normal room temperature, and as low as —15° C. or lower, that the possibility of the polymerization to undesirable, resinous products of high boiling-point is avoided and that in operating at these temperatures, substantially only primary, valuable ketone-like products will be formed. This phenomena is particularly true when operating upon certain hydrocarbons by means of the specific reacting components as will be later described.

The invention disclosed herein is preferably carried out on non-aromatic, that is aliphatic or alicyclic saturated hydrocarbons free from tertiary carbon atoms. These hydrocarbons are obtainable from earth-oil, browncoal-tar, cracked products or also synthetically.

The operation which has been found to successfully produce pure and desirable reaction products of a ketone-like nature from non-aromatic, that is aliphatic or alicyclic saturated hydrocarbons free from tertiary carbon atoms will now be described in greater detail. Mix together in a reacting vessel the corresponding quantities of non-aromatic, that is aliphatic or alicyclic saturated hydrocarbons free from tertiary carbon atoms and phosgene in the presence of aluminum bromide or aluminum iodide. The vessel is closed and is adapted by means of suitable equipment to permit a cooling of the reacting components to well below 0° C. if desired. It was found, however, that the preferred temperatures of operation are between 0 and 5° C. This reacting vessel is also preferably fitted with a mixing device in order to permit a thorough stirring of the mass to facilitate the reaction. The reacted mass can then be decomposed by the addition of water and a sweet-smelling ethereal oil formed. This oil is preferably separated by steam distillation. It was found that the resulting product is substantially pure and free from resinous, polymerized components, and other undesirable difficultly separable products. In this case it was found that by carrying out the reaction below normal room temperature, and preferably between 0 and 5° C. upon non-aromatic, that is aliphatic or alicyclic saturated hydrocarbons and by using phosgene with aluminum bromide or aluminum iodide, that the production of undesirable worthless resins of high boiling point and polymer compounds difficult to separate is avoided and that by means of this operation, it is possible to obtain a primarily formed substantially pure product and one which has been found to be highly desirable commercially. These products consist essentially of ketones and reduction by sodium and alcohol gives substances which can be esterified by acids. Apparently the structure of these products consists of two molecules from the hydrocarbon starting material which are bound together by a single CO-group.

The following examples will more specifically illustrate the nature of the invention. However, it is not intended that these examples shall limit the scope of the invention, and it will be apparent to those skilled in the art that other modifications may be made without departing from the spirit of the invention. Throughout these examples the parts have been given by weight:

Example 1

42 parts of cyclohexane are mixed with 25 parts of phosgene and 120 parts of aluminum bromide in an autoclave at a temperature of about —10° C. and, after the autoclave has been closed, the materials are slowly heated to a temperature of up to about +5° centigrade, while the mass is thoroughly stirred up and mixed by a rapidly-running stirrer. This temperature is maintained for about 8 to 12 hours. After the decomposition of the mass by water the reaction product is distilled off by steam. A sweet smelling ethereal oil is obtained which boils at about 80° to 110° centigrade (20–30 mm. mercury).

*Example 2*

84 parts of cyclohexane are treated with 50 parts of phosgene free from water and 400 parts of aluminum iodide in an autoclave at a temperature of about 0° C. by intensive mixing with a stirrer for 4 to 6 hours. The hydrogen iodide which is developed is blown off, and the reaction product is decomposed by ice water. 80 parts of a sweet smelling oil is obtained by steam distillation. The oil boils at 80°–110° C. (30 mm. mercury) and contains mainly ketones.

*Example 3*

86 parts of normal hexane ($CH_3$—$CH_2$—$CH_2$—$CH_2$—$CH_2$—$CH_3$) are stirred with 50 parts of phosgene and 260 parts of aluminum bromide free from water during 4 to 6 hours at a temperature of about the freezing point. Then the hydrogen bromide formed is taken off, and the reaction product decomposed by ice. An oil is distilled off by means of steam. 75 parts of this oil are obtained which consists mainly of ketones and which boil at 75°–100° C. (30 mm. mercury).

What is claimed is:

1. In the manufacture of organic products containing oxygen the step of treating saturated aliphatic hydrocarbons containing no tertiary carbon atom with phosgene in the presence of an aluminum compound of a non-gaseous halogen, while maintaining the reaction conditions below room temperature.

2. In the manufacture of organic products containing oxygen the step of treating saturated alicyclic hydrocarbons containing no tertiary carbon atom with phosgene in the presence of aluminum compound of a non-gaseous halogen, while maintaining the reaction conditions below room temperature.

3. In the manufacture of organic products containing oxygen the step of treating mixtures of saturated aliphatic and alicyclic hydrocarbons containing no tertiary carbon atom with phosgene in the presence of aluminum compound of a non-gaseous halogen, while maintaining the reaction conditions below room temperature.

4. In the manufacture of organic products containing oxygen the step of treating saturated non-aromatic hydrocarbons containing no tertiary carbon atom with phosgene in the presence of an aluminum compound of a non-gaseous halogen while maintaining the reaction conditions below room temperature.

5. In the manufacture of organic products containing oxygen the step of treating saturated non-aromatic hydrocarbons containing no tertiary carbon atom with phosgene in the presence of aluminum bromide while maintaining the reaction conditions below room temperature.

6. In the manufacture of organic products containing oxygen the step of treating saturated non-aromatic hydrocarbons containing no tertiary carbon atom with phosgene in the presence of aluminum iodide while maintaining the reaction conditions below room temperature.

7. The process for manufacturing organic products containing oxygen comprising treating saturated non-aromatic hydrocarbons free from tertiary carbon atoms with phosgene in the presence of aluminum bromide while maintaining the temperature conditions of the reacted mass below 5° C.

8. The process for manufacturing organic products containing oxygen comprising treating saturated non-aromatic hydrocarbons free from tertiary carbon atoms with phosgene in the presence of aluminum iodide while maintaining the temperature conditions of the reacted mass below 5° C.

ERNA MAGDA IRMGARD SCHAARSCHMIDT,
*Administratrix of the Estate of Alfred Schaarschmidt, Deceased.*